United States Patent [19]

Baxmann et al.

[11] 4,046,945

[45] Sept. 6, 1977

[54] PROCESS FOR THE BONDING OF FILMS AND MOLDED COMPONENTS

[75] Inventors: Fritz Baxmann; Albert Frese; Hermann Röben, all of Marl; Jürgen Wolpers, Wulfen, all of Germany

[73] Assignee: Chemische Werke Huls Aktiengesellschaft, Marl, Germany

[21] Appl. No.: 540,534

[22] Filed: Jan. 13, 1975

[30] Foreign Application Priority Data

Jan. 18, 1974  Germany ............................. 2402259

[51] Int. Cl.² .................. D04H 1/16; B32B 17/10; B32B 27/34; C09J 3/14
[52] U.S. Cl. ................... 428/282; 156/309; 156/334; 260/33.6 PQ; 260/42.46; 428/280; 428/286; 428/287; 428/441; 428/451; 428/483; 428/500; 428/513; 428/516; 428/517; 428/518; 428/519; 428/520; 428/522; 428/474
[58] Field of Search ............... 428/516, 518, 520, 522, 428/349, 517, 512, 451, 483, 519, 286, 287, 282, 500, 441, 509, 513, 280, 474; 156/334, 309; 260/33.6 PQ, 42.46

[56] References Cited

U.S. PATENT DOCUMENTS

| 3,367,909 | 2/1968 | Hay | 156/334 |
| 3,444,117 | 5/1969 | Higgins | 260/33.6 PQ |
| 3,634,551 | 1/1972 | Stancell | 156/334 |
| 3,660,224 | 5/1972 | Cou | 156/334 |
| 3,705,884 | 12/1972 | Frese | 260/80.78 |
| 3,900,361 | 8/1975 | Hoppe | 156/334 |

*Primary Examiner* — Ellis Robinson
*Attorney, Agent, or Firm* — Millen & White

[57] ABSTRACT

Films, sheets, molded components and parts of other shaped articles formed from a plastomer or elastomer are bonded together or to a substrate employing as an adhesive an adhesive composition heated to 50°–250° C. and consisting essentially of:

a. 5–95% by weight of solid or semi-solid atactic poly-α-olefin or mixture of poly-α-olefins having a reduced specific viscosity of 0.05–5.0 dl./g.;

b. 95–5% by weight of liquid atactic polyolefin or mixture of polyolefins having a viscosity of 150–1,000,000 cp./20° C.; and c. optionally, up to 50% by weight of filler.

15 Claims, No Drawings

PROCESS FOR THE BONDING OF FILMS AND MOLDED COMPONENTS

BACKGROUND OF THE INVENTION

This invention relates to a process for the bonding of films, sheets and molded or extruded components formed from elastic and thermoplastic polymers.

The joining of molded components and films of ethylene-propylene rubber has theretofore been possible only with the aid of complicated and expensive techniques. Generally, films of ethylene-propylene rubber are joined together with adhesive strips. These adhesive strips consist, for example, of polyisobutylene, modified with bitumen and/or phenolic resins or other additives, or also of ethylene-vinyl acetate copolymers. These adhesive strips are preferably caused to begin to disssolve by means of solvents, e.g., benzine (petroleum ether), and are then pressed by rolling onto the film sections of ehtylene-propylene rubber to be bonded together.

It is also possible to effect a bond by prefabricating sheets or panels of the elastomer films into large-area covers. During the prefinishing step, the smaller sheets are joined with the aid of non-vulcanized strips and are vulcanized by the action of heat and optionally also by the action of pressure.

Both possibilities for the joining of parts of ethylene-propylene rubber, especially of unsaturated ethylene-propylene rubber, are very complicated and thus unsatisfactory. This is essentially the reason why films of ethylene-propylene rubber have been utilized heretofore only to a very minor extent.

There has thus been a need in the art for providing a usuable, simpler process suitable for the cementing of parts of elastomers as well as plastomers.

The process of this invention employs an adhesive composition comprising a mixture of atactic polyolefins. Processes are known from German Pat. No. 1,931,421, according to which viscous masses similar to the adhesives employed in this process can be produced. Also, it has been known that these masses can be utilized as lubricants having an improved viscosity characteristic, as an additive to lubricating oils to improve their viscosity, as rolling oils, as pore regulators during foam manufacture, and, in case of higher atactic proportions, as cable compounds and sealing compositions. Surprisingly, it has now been discovered that these compositions are suitable as adhesives. This property could not be predicted from the known, but basically different, practical applications of the conventional, similar masses.

SUMMARY OF THE INVENTION

According to this invention, films, sheets molded and/or extruded articles and like shaped articles formed of a thermoplastic elastomer are bonded together employing an adhesive composition at an elevated temperature of up to 250° C. and consisting essentially of:
a. 5–95% by weight of a solid or semi-solid atactic poly-α-olefin or mixture of poly-α-olfins having a reduced specific viscosity of 0.05–5.0 dl./g.;
b. 95–5% by weight of liquid atactic polyolefin or mixture of polyolefins having a viscosity of 150–1,000,000 cp./20° C., and
c. optionally, up to 50% by weight of filler.

DETAILED DISCUSSION

It could not be anticipated that by means of the adhesive compositions employed in the process of this invention it is possible in a simple manner to bond together shaped elastomeric articles such as, for example, films of ethylene-propylene rubber. In a close adaptation to the generally customary techniques when sealing with bitumen, the bonding step using this composition can be accomplished simply by spreading the adhesive composition by means of a brush or by pouring and subsequent distribution with a steel trowel.

A preferred adhesive composition is a mixture of, as component (a), approximately 30–70% by weight of an extensively atactic, i.e., an ether-soluble proportion of more than 50% polypropylene, polybutene-1, the copolymers and terpolymers thereof with, for example, ethene, propene, 1-butene, 1-hexene, or a mixture thereof and, as component (b) about 70–30% by weight of a polybutene oil having a viscosity of 150 cp./20° C. to 1,000,000 cp./20° C, especially 1,000 cp./20° C. to 100,000 cp./20° C.

The adhesive compositions are obtained, for example, by dissolving 5–95% by weight of, as component (a), a solid or semi-solid atactic poly-α-olfin or poly-α-olefin mixture with a reduced specific viscosity of 0.05–5.0 dl./g. in, as component (b), 95–5% by weight of liquid atactic polyolefin or a mixture of polyolfins with a viscosity of 150–1,000,000 cp./20° C. at temperatures of 160°–250° C. The two polymers can be obtained in accordance with the process described in German Pat. No. 1,931,421.

As well as the mixtures obtained by mixing the two components, also suitable as adhesive compositions are the polymrization products of two-stage polymerizations. In this procedure, an α-olefin or α-olefin mixture is polymerized with Ziegler catalysts of low stereospecificity and then further polymerized, optionally after replenishing the consumed α-olefins by the same or other olefins, with Friedel-Crafts catalysts. This mode of operation can also be derived from German Pat. No. 1,931,421.

Atactic polypropylene based adhesive compositions are utilized perferably at a temperature of 160°–250° C. However, these adhesive compositions also have excellent cohesive strength at lower temperatures, e.g., 70° C. and above. Atactic polybutene-1 based adhesive compositions have the advantage that they can also be used at even lower temperatures, i.e., down to about 50° C. The higher temperature of the melt compositions also leads in case of these compounds to a tighter adhesive bond. An adhesive composition formed from a mixture of atactic polypropylene with atactic polybutene-1 has the advantage of easier processability at lower temperatures with a good cohesive strength even at temperatures of 70° C. and above.

The thus-bonded parts show good peeling resistance and also good shear strength. Surprisingly, the shear strength can be improved by the presence of a filler, such as, for example, chalk, kaolin, talc, heavy spar, baryte, rock flour and/or carbon black, or like inert water insoluble inorganic powder. These fillers are added in an amount of up to 50%, e.g., 20 to 40%, by weight, based on the total adhesive mixture.

These adhesive compositions are also suitable, in addition to being used for the bonding together of pieces of ethylene-propylene and ethylene-butene-1 rubbers, which are difficult to join, for the bonding of other natural and synthetic types of rubber, such as, for example, butadiene-styrene rubber, butadiene-acrylonitrile rubber, butyl rubber, polybutadiene and polyisoprene. They are suitable not only for the cementing of components made of these rubbers, but also for the cementing of parts of these rubbers to a substrate, e.g., for bonding ethylene-propylene rubber films to roof surfaces. This substrate can consist, for example, of wood, rock, mansonry, concrete, polyester or roofing felt. It is also possible to bond with this adhesive composition parts of plastomers, such as polyolefins, especially polybutene-1 or also of polystyrene. This has the advantage that it is possible, for example, at a building site, to cement, with one adhesive composition, parts of different materials together, e.g., to bond a heat-insulating layer of polystyrene foam by means of the same adhesive composition as the roofing skin of ethylene-propylene rubber or butyl rubber, and/or films and molded components of polyolefins, such as polyethylene, polypropylene and polybutene-1, of hard and soft PVC, as well as other plastomers, and metals, such as iron, copper, lead and zinc, as well as glass.

The process of this invention is particularly useful for the formation of build-up roofs comprising a film of an elastomer, e.g., ethylene-propylene rubber, and PVC or other like thermoplastic polymer. Using such a heated adhesive, sheets of the elastomer can be formed at the site into a seamless barrier covering the whole roof which, in turn, can, if desired, be bonded to an underlying substrate, e.g., the concrete or wooden roof surface, to an intermediate layer, e.g., roofing felt, rigid foam and/or to a layer covering the seamless barrier, e.g., gravel or a PVC film.

In addition to bonding sections of elastomer films to each other and to substrates, the adhesive can be used, e.g., for bonding of parts of
polybutene-1
polystyrene foam
other thermoplastic materials
other elastomeric materials
wood, stone, concrete, glass, metal
with each other.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

An adhesive composition consisting of, as component (b), 50% by weight of a polybutene oil having a molecular weight of 680 and a viscosity of 4,100 cp./20° C., which contains no readily boiling components boiling below 150° C. at 15 mm. Hg, produced by polymerization of a $C_4$-cut of 43% isobutene, 24% butene-1, 24% butene-2 and 9% butane at 30° C. in the presence of 1% 1,3-butadiene with the aid of 0.4% by weight of $AlCl_3$ as the catalyst; and, as component (a), 50% by weight of an extensively amorphous butene-1/propene/ethene terpolymer containing about 8% propene and 1% ethene and having an RSV value of 0.4 dl./g. and an ether-soluble proportion of 93%, obtained by polymerization of butene-1 with 8% propene and 1% ethene with a catalyst of $TiCl_3 \cdot 0.5\ AlCl_3$ and $Al(C_4H_9)_3$ at 80° C. and under a partial hydrogen pressure of 20 atmospheres, is heated to 200° C. This spreadable mass is applied with brushes as five spots having the size of the brush per $m^2$ to a concrete roof cover and a film of ethylene-propylene rubber to serve as a vapor barrier and compensating layer is glued onto the cover with the aid of this hot composition by a spotwise of S-shaped cementing operation. During this process, the individual film panels are sealed together along their seams with the hot adhesive composition, with the individual film panels overlapping along their sealed seams by 5-10 cm. The topside of this film of ethylene-propylene rubber is covered completely by spreading with this same adhesive composition heated to 200° C. After the composition has cooled to about 120° C., foam panels of polystyrene are glued thereon as a thermal insulating layer. On the topside of these foam panels, the adhesive composition of 120°-130° C. is applied in spots by means of brushes at a rate of five spots of the size of the brush per $m^2$ and a bituminous sealing sheet is glued thereon by this adhesive composition. The topside of this bituminous sealing sheet is covered completely with the 200° C. adhesive composition employing brushes, and a film of ethylene-propylene rubber laid thereon and cemented thereto by this composition. During this step, seams and butt joints are likewise sealed together with the hot adhesive composition. In this way, a high-quality, durable roof covering is obtained.

EXAMPLE 2

An adhesive composition consisting of, as component (b), 50% by weight of a polybutene oil having a molecular weight of 870 and a viscosity of 88,000 cp./20° C., which contains no readily boiling components that boil below 150° C. at 15 mm. Hg., obtained by the polymerization of a $C_4$-cut of 52% butene-1, 40% butene-2, and 8% butane in the presence of 20% of butadiene, with 0.5% of $AlCl_3$ at 40° C.; and, as component (a), 50% by weight of an extensively atactic polypropylene having an RSV value of 0.5 dl./g., a by-product obtained during the manufacture of isotactic polypropylene, is heated to 220° C. With the aid of this hot adhesive composition, film panels of ethylene-propylene rubber are sealed together along their seams into a cover or "tarpaulin." The overlapping of the individual film panels along their seams during the gluing step is 10 cm. This prefabricated sheet is loosely laid on a concrete surface. Foam panels of polystyrene are loosely laid on top of this sheet. A second sheet of ethylene-propylene film panels, likewise bonded with the 220° C. adhesive composition, is loosely laid on top of these foam panels. On top of this sheet, as surface protection, a polyethylene film having a thickness of 0.1-2.0 mm. is loosely installed. The roof is covered with a gravel layer of a thickness of 5 cm.; to improve the adherence, the gravel layer is sprayed with the hot adhesive composition.

With the aid of this adhesive composition and/or the adhesive composition employed in Example 1, it is also possible to glue together films of butyl rubber.

EXAMPLE 3

An adhesive composition consisting of, as component (b), 33% by weight of a polybutene oil with a viscosity of 10,400 cp./20° C. and a molecular weight of 760, which contains no readily boiling components that boil below 150° C. at 15 mm. Hg, obtained by the polymerization of a $C_4$-cut of 52% butene-1, 40% butene-2 and 8% butane in the presence of 5% of butadiene with 0.4% of $AlCl_3$ at 30° C.; as component (a), 17% by weight of an extensively amorphous polybutene-1, obtained according to the procedure of Example 1 and 17% by weight of the atactic polypropylene utilized in Example 2; and, as component (c), 33% by weight of chalk, is heated to 220° C. Films of ethylene-propylene rubber are permanently bonded together with this hot adhesive composition, by simply spreading the composition thereon and pressing the parts together. The composition is also excellently suitable for the cementing together of parts made of other rubber types and synthetic resins, such as, for example, butadiene-styrene rubber, polybutadiene, polyisoprene, natural rubber, polybutene-1 and polystyrene.

EXAMPLE 4

Two freshly prepared pressed sheets of isotactic polybutene (RSV value 3.6 dl./g.) with a tear strength of 220 kp/cm² and a thickness of 1 mm. are coated with a strip of the adhesive composition used in Example 1 at a temperature of 100° C. along one edge thereof. The adhesive coated portion of the panels are then overlapped by 1 cm. and thereafter pressed together for 10 minutes under a pressure of 10 atmospheres gauge at 100° C. The bonding zone has a tear strength of 165 kp/cm². This corresponds to a cohesive factor of 0.75.

EXAMPLE 5

A 50-liter pressure vessel with agitator is charged with a mixture of 18 parts by weight of a $C_4$-cut consisting of 56% butene-1, 20% trans-butene-2, 16% cis-butene-2 and 8% butane, and 1.5 parts by weight of propene. By way of a charging valve, 0.015 parts by weight of titanium tetrachloride and 0.066 part by weight of a 20% solution of triisobutylaluminum in hexane are added to the reaction mixture. With this catalyst system, the polymerization is conducted for 3 hours under agitation at 130° C. Thereafter, the mixture is cooled to 30° C. After the addition of 0.2 part by weight of aluminum chloride, anhydrous, via a charging valve, the polymerization is continued at 30° C. After 8 hours, the polymerization is terminated. For working-up purposes, the composition is washed out with water at 90° C. In a simple stripping distillation unit, the low-boiling components and the water residual are distilled off at 15 mm. Hg and 150° C.

This composition, heated at a temperature of 150° C., is applied with brushes as a continuous coating to a concrete roof covering. Films of hard PVC are glued to the cooled composition. During this step, the individual film panels are likewise sealed together along their seams with the adhesive composition, cooled to about 60°-80° C. The overlapping of the individual film panels is 5-10 cm. In this way, a firm and permanent bond is achieved.

It is possible in the same manner to bond together films made of soft PVC (plasticizer containing PVC).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for bonding unheated pieces of elastic polymers and thermoplastic polymers in film or shaped form to each other or to a suitable substrate selected from the group consisting of wool, wood, masonry, concrete, glass, metals, polyesters and roofing felt, the improvement which comprises employing as the bonding agent an adhesive composition heated at a temperature of up to 250° C. and consisting essentially of:
   a. 5-95% by weight of a solid or semi-solid atactic poly-α-olefin or poly-α-olefin mixture having a reduced specific viscosity of 0.05-5.0 dl./g.;
   b. 95-5% by weight of liquid atactic polybutene or polybutene mixture having a viscosity of 150-1,000,000 cp./20° C. which contains no readily boiling components that boil below 150° C. at 15 mm. Hg pressure; and
   c. up to 50% by weight of the adhesive composition of an inert, water insoluble inorganic filler.

2. A process according to claim 1 wherein the adhesive composition contains chalk as a filler.

3. A process according to claim 1 wherein an adhesive composition containing 5-95% by weight of an atactic polypropylene at a temperature of 160°-250° C. is employed.

4. A process according to claim 1 wherein an adhesive composition at a temperature of 50°-250° C. and containing 5-95% by weight of a solid or semi-solid atactic polybutene-1 is employed.

5. A process according to claim 1 wherein the adhesive composition contains 5-95% by weight of a mixture of atactic polypropylene as component (a) and liquid atactic polybutene-1 as component (b).

6. A process according to claim 1 wherein the adhesive composition consists essentially of, as component (a) 30-70% by weight of an extensively atactic polypropylene, polybutene-1, copolymers thereof, terpolymers thereof with ethene, propene, 1-butene, 1-hexene, or a mixture thereof and, as component (b) 70-30% by weight of a polybutene oil having a viscosity of 150-1,000,000 cp./20° C.

7. A process according to claim 6 wherein the polybutene oil has a viscosity of 1,000-100,000 cp./20° C.

8. An article of manufacture comprising a section of elastomer film bonded to another section of elastomer film or to a substrate selected from the group consisting of wool, wood, masonry, concrete, glass, metals, polyesters and roofing felt by spreading onto an unheated section or substrate an adhesive composition consisting essentially of:
   a. 5-95% by weight of a solid or semi-solid atactic poly-α-olefin or poly-α-olefin mixture having a reduced specific viscosity of 0.05-5.0 dl./g.;
   b. 95-5% by weight of liquid atactic polybutene or polybutene mixture having a viscosity of 150-1,000,000 cp./20° C. which contains no readily boiling components that boil below 150° C. at 15 mm. Hg pressure; and
   c. up to 50% by weight of the adhesive composition of an inert, water insoluble inorganic filler.

9. An article of manufacture according to claim 8 wherein a plurality of sections of an elastomer are bonded together.

10. An article of manufacture according to claim 9 wherein the elastomer is an ethylene-propylene or ethylene butene-1 rubber.

11. A process according to claim 1, wherein said polymer is an elastic polymer selected from the group consisting of ethylene-propylene, ethylene-butene-1, butadiene-styrene, butadiene-acrylonitrile, butyl rubber, polybutadiene and polyisoprene.

12. A process according to claim 11, wherein said elastic polymer is an ethylene-propylene or ethylene-butene-1 rubber.

13. A process according to claim 1, wherein said polymer is a thermoplastic polymer selected from the group consisting of polyethylene, polypropylene, polybutene-1, polystyrene and polyvinylchloride.

14. A process according to claim 13, wherein said thermoplastic polymer is polybutene-1 or polystyrene.

15. A process according to claim 13, wherein an elastic polymer selected from the group consisting of ethylene-propylene or ethylene-butene-1 rubbers is bonded to said thermoplastic polymer.

* * * * *